W. B. TAYLOR.
HARROW.
APPLICATION FILED JUNE 30, 1914.
1,147,907.
Patented July 27, 1915.
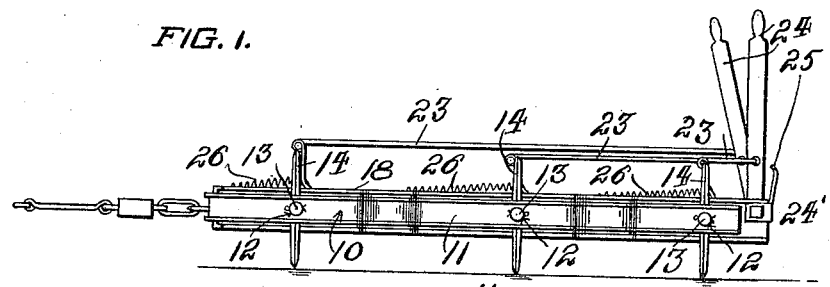
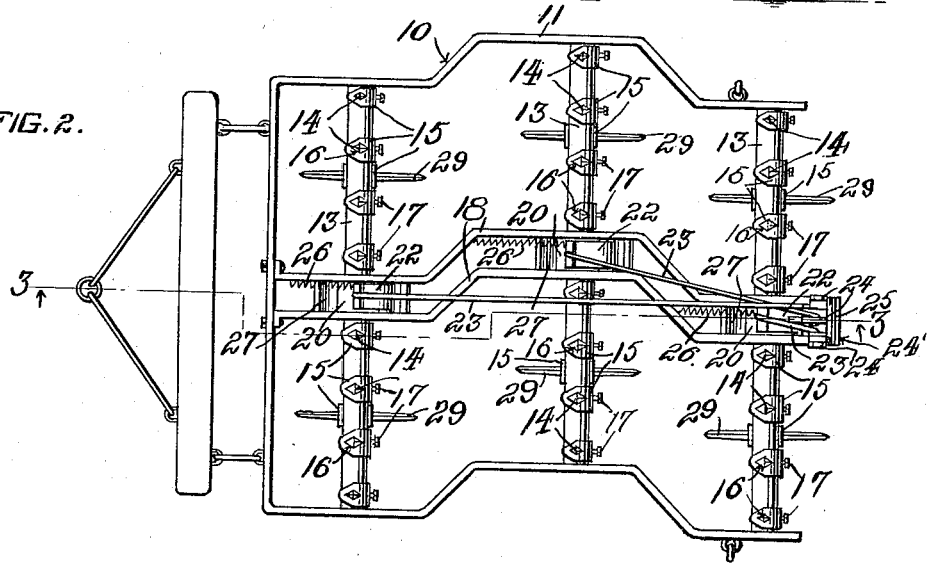
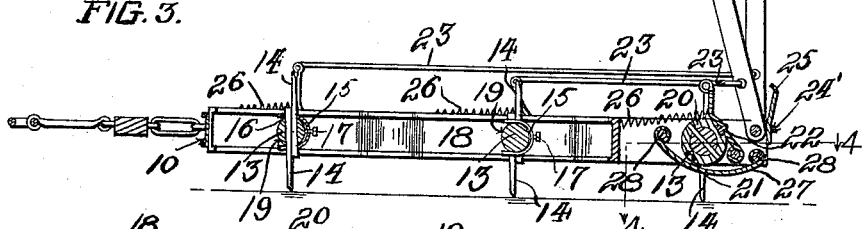
Inventor
W. B. Taylor

UNITED STATES PATENT OFFICE.

WARDEN B. TAYLOR, OF LAUREL BLOOMERY, TENNESSEE.

HARROW.

1,147,907.

Specification of Letters Patent.

Patented July 27, 1915.

Application filed June 30, 1914. Serial No. 348,233.

*To all whom it may concern:*

Be it known that I, WARDEN B. TAYLOR, a citizen of the United States, residing at Laurel Bloomery, in the county of Johnson, State of Tennessee, have invented certain new and useful Improvements in Harrows; and I do hereby declare the following to be a full, clear, and exact description of the invention, such as will enable others skilled in the art to which it appertains to make and use the same.

This invention relates to improvements in self-cleaning harrows and has for one of its objects to provide a machine of this character in which the tooth carrying elements are rotatably mounted in a suitable frame, said elements being adapted to automatically operate for the purpose of clearing the teeth of weeds or other trash.

A further object of the invention resides in the provision of a simple and novel form of latch for locking the tooth carrying elements against rotation, means being provided for releasing said latches to permit of clearing of the teeth.

With the above and other objects of similar nature in view, the invention consists in the construction, combination and arrangement of parts, set forth in and falling within the scope of the appended claim.

In the drawings: Figure 1 is a side elevation of a harrow constructed in accordance with the invention, Fig. 2 is a top plan view thereof, Fig. 3 is a longitudinal sectional view on the line 3—3 of Fig. 2, and Fig. 4 is a detail sectional view taken on the line 4—4 of Fig. 3.

Referring now more particularly to the drawing, the harrow comprises a frame 10 which is substantially U-shaped in plan and constructed preferably of channel iron, the arms of the U being formed with offset portions 11 and further provided with transversely alined openings 12. Arranged transversely of the frame and mounted for rotation within the openings 12 are a plurality of tooth bars 13, each of which is provided with sets of oppositely directed pairs of spiked teeth 14, each pair thereof being securely held in place by means of a clip 15. It will be noted that the teeth of each pair are separable and taper from end to end, and are driven through the tooth bars 13 from opposite sides thereof and with the butts disposed in overlapped relation. The clip 15 embraces the tooth bar 13 and is provided with alined openings 16 to receive the overlapped portions of the teeth, a set screw 17, which is threadedly engaged in said clip, being tightened against the bar to secure the teeth firmly in position. By this construction it is obvious that should there be a tendency for one of the teeth to withdraw from the tooth bar, the frictional engagement thereof with the other of said teeth will force the latter more tightly in position and thereby prevent such displacement being effected. It will further be noted that by overlapping the teeth in the manner illustrated, the bar engaging portions thereof are reinforced and liability of breakage materially lessened.

Arranged longitudinally of the frame and having their forward ends bent and securely bolted to the arm connecting portion thereof are a pair of spaced, parallel bars 18, said bars being preferably offset to correspond to the offset portions of the frame and provided with openings through which the tooth bars 13 are loosely passed. Fixed upon each of the tooth bars and disposed between the bars 18 is a collar 20, having formed at diametrically opposite points therein recesses or sockets 21, a pivoted latch 22 being carried between said bars 18 and adapted to enter either of said sockets to lock the tooth bar against rotation. Loosely connected to the upper end of the latch 22 is a pull rod 23 the opposite end of which is similarly connected to a lever 24 that is mounted between and adjacent the rear ends of the bars 18, a U-shaped plate 24' embracing said ends of the bars and being provided with an upstanding portion 25 adapted to limit rearward movement of the lever. Arranged between the latch 22 and one of the bars 18 is a helical spring 26, which spring normally draws said latch forwardly on its pivot and retains the tooth bar in its locked position. There is further provided between the bars 18 and latching elements 21 and 22, a guard plate 27, the same being secured in position by means of bolts 28 and designed to prevent clogging of said elements with dirt and trash.

Having now fully described the machine, should it be desired to clean the teeth during the harrowing operation, the levers 23 are operated to move the latches 22 out of engagement with the sockets 21, thus permit- ting the tooth bars 13 to rotate under the influence of travel of the machine and quickly free the teeth from dirt and trash. Continued rotation of the tooth bars will then bring the other sets of teeth into harrowing position, at which time the latches 22 will be returned to their normal position under the influence of the springs 26 and the bars again locked against rotation. It may further be added that, to insure complete rotation of the tooth bars 13 there are arranged therein and at right angles to the teeth 14 additional sets of teeth 29. It will also be noted that the levers 24 being operated independently, one or more sets of teeth will always remain in engagement with the ground, thus leaving no portion thereof unharrowed while the operation of cleaning the teeth is in progress.

What is claimed is:

A harrow comprising a frame, tooth bars rotatably mounted in said frame, spaced bars arranged longitudinally of the frame, collars fixed to said tooth bars and disposed between the spaced bars and having recesses formed therein, latches mounted between said spaced bars and normally engaged in the recesses whereby said tooth bars will be locked against rotation, spring means for retaining said latches in their normal position and means for releasing said latches.

In testimony whereof, I affix my signature, in the presence of two witnesses.

WARDEN B. TAYLOR.

Witnesses:
J. P. SUTHERLAND,
W. C. WRIGHT.

Copies of this patent may be obtained for five cents each, by addressing the "Commissioner of Patents, Washington, D. C."